Patented Mar. 17, 1931

1,797,002

UNITED STATES PATENT OFFICE

ARTHUR LAMBERT, OF NEW YORK, N. Y., ASSIGNOR TO COSMIC ARTS, INC., OF NEW YORK, N. Y., A CORPORATION OF DELAWARE

PROCESS OF TREATING GREENSAND

No Drawing.   Application filed November 28, 1924.   Serial No. 752,804.

This invention relates to a novel process of treating materials such as green sand; salts of potash (sylvinite for example) the residues of caliche solutions; and manufacturing wastes and residues generally that contain silica and alumina combined, or mixed with other salts of the alkali metals or earth alkali metals.

The invention has for an object to cheapen the extraction of desired substances, such as potash, from these materials, this object being attained in part by the extraction of different substances from a given material, instead of a single substance as has been common in carrying out processes of this general nature.

A further and more specific object of the invention is to recover in their entirety the soluble salts ordinarily remaining after the treatment of green sand to extract potash; obtaining for instance an increase of alumina without increased expense by carrying out all the operations in one mill.

As an illustration of my improved process I shall describe first the treatment of green sand according to my invention. Up to the present time the treatment of green sand has been effected by lime, the main object in view being the extraction of potash. I have found it possible to advance the art in this respect by recovering, co-incidently with the potash, such substances as sodium compounds, silica, alumina, and iron oxide, these latter being useful trade products whose recovery serves to reduce the cost of extraction, which is comparatively high when the process is limited to the extraction or recovery of a single product.

I have found that to secure the results aimed at it is desirable to replace lime (employed in known processes) by soda in some form, the product being treated by a series of simple operations to recover each of the substances contained therein. In carrying out the process I may either first render the green sand soluble, and then dissolve the mass with an appropriate acid; or the green sand may be attacked directly by means of mineral acids that do not attack the silica but dissolve all the other substances.

As an example of the first method of carrying out the process the green sand, after having been rid of loose foreign substances, is melted with a sodium compound. For instance a mixture of green sand with sodium carbonate, or caustic soda, is brought to a high temperature, sufficient to effect a melting of the mixture. Instead of using either sodium carbonate or caustic soda alone a mixture of these two substances might be employed, this mixture bearing the same proportion to the total as when one alone is used. The melted mixture is solidified by pouring it into a certain quantity of water, the steam and heat thus generated being utilized in any desired manner. Afterwards the solidified lumps are crushed to small size to facilitate action of the acids thereon. The finely divided material is then treated by means of a suitable acid. For this purpose I may utilize either of the following acids, depending on conditions, such as the final product in view: Hydrochloric acid, sulphuric acid, or nitric acid. The solution is then neutralized, the neutralization being conveniently effected by means of either ammonia or sodium carbonate.

I thus obtain a solution of a plurality of alkali metal salts, and containing the potassium and sodium contained in the mineral and also the sodium (as a salt, of course) contained in the reagents. I may then separate the sodium from the potassium by double decomposition, either by treatment with caliche, as indicated below, or with carbon dioxide and ammonia, as described in my United States Patent No. 1,660,561.

The second method of carrying out the process consists in attacking the green sand directly by an acid. For this purpose, I may use either hydrochloric, sulphuric, or nitric acid, or I may use an acid sulphate, the operation being conducted at heat either in the open air or under pressure. When the green sand is treated with hydrochloric acid potassium chloride is first obtained, neutralization being then effected by the use of ammonia or sodium carbonate. I may also add to the green sand, before treatment, caliche residues containing a certain percentage of sodium nitrate. In this case a double reaction takes place between the potassium chloride and sodium nitrate, producing potassium nitrate. The process might also be carried out in some cases by treating a caliche or sodium nitrate solution. An advantage is derived from the unitary treatment of green sand and caliche in that the silica of the caliche is added to the silica of the green sand and contributes to the production of ordinary sodium silicate or alkasil when the mixture is fused, as above described, with sodium carbonate or caustic soda. I contemplate also, as within the scope of this process, the use of other substances such as the leucite, feldspar, the residue of tequerquite, or different solutions of potash salts, or any other manufacturing waste containing either silica or alumina together with an alkaline base. In such cases it is essential to finely crush the material previous to treatment with the acid.

The use of nitric acid in attacking the green sand has certain advantages in that an immediate yield of both nitrate of aluminum and nitrate of potassium is obtained, while a nitrate of iron is also obtained when iron sesquioxide is present. During heating, the nitric acid may be recovered from the vapors released by the sesquioxide of iron; the recovery of the nitric acid thus serving to reduce its cost to a negligible quantity. By the use of water the undecomposed potassium nitrate is recovered, and by means of suitable apparatus, such as the apparatus of Kestner, the liquors can be concentrated at small cost, since this apparatus can be operated even on waste heat. Alumina is also recovered by separation from the iron oxide, as a preliminary previous step to the manufacture of aluminum. By treating green sand according to my process I obtain therefore the following products: ordinary silicate of soda; mono-silicate of soda; or alkasil; alumina; oxide of iron, and potash.

My improved process renders it possible to utilize also materials having a low potash content, such as modern algæ, lake algæ, materials originating from the wasting of wool, cement factory residues, vegetable ashes, Russian turnsole or litmus.

As a further method of carrying out the treatment of green sand, or other sources of salts of the alkali metals such as feldspar, sylvanite, leucanite, the material to be treated may be boiled in water containing salts of the alkali metals or salts of alkaline earths, either alone or in various combinations. For example, in thus treating green sand, or the chloride-containing liquor obtained as above described, with a solution of sodium nitrate or of caliche, there is formed (in spite of the presence of other salts) with the potassium chloride, potassium nitrate and sodium chloride. With potassium-containing feldspars, sylvanite, leucite, or other material containing potassium chloride, the reaction is the same.

The sodium chloride resulting from the double decomposition when caliche is treated may be utilized in the manufacture of soda by the ammonia process, or for the manufacture of caustic soda, of chlorine, or hydrogen, by means of electricity. The resulting hydrogen may be used for the synthetic manufacture of ammonia; while the iodine present is also recovered.

When bicarbonate of soda originating from the ammonia process is used in the purification of the solutions, a new fertilizer containing ammonia salts and potassium salts is obtained from all the residues treated in a single operation. A further advantageous result is the collecting of from twenty to twenty-five per cent of floating slimes which settle at heat within twelve hours, and contain aluminum and iron oxide, the relative quantities of these two substances varying according to the particular treatment.

Wherever in the appended claims I have referred to alkali metals, or to salts of the alkali metals, I desire it to be understood that alkali earth metals, or salts of the alkali earth metals respectively, are to be considered to be covered as equivalents.

What is claimed is:

1. The method of treating potassium containing minerals, which comprises subjecting such minerals to the action of an acid, neutralizing the resulting solution with a solution containing a basic sodium compound, and treating the solution with ammonia and carbon dioxide to precipitate sodium bicarbonate.

2. The method of treating green sand, which comprises reacting the same with an acid and with a basic sodium compound to produce a substantially neutral solution containing potassium and sodium salts, and then precipitating the sodium in combined form as bicarbonate and leaving the potassium salts in solution.

3. The method of treating green sand, which comprises reacting the same with an acid and with a basic sodium compound to produce a substantially neutral solution containing potassium and sodium salts, and then treating said solution with carbon dioxide and ammonia to precipitate the sodium in combined form by double decomposition.

4. The method of treating a silicate containing potassium, which comprises reacting the same with an acid and with a basic sodium compound to produce a substantially neutral solution containing potassium and sodium salts, and then precipitating the sodium in combined form as bicarbonate and leaving the potassium salts in solution.

In testimony whereof I have affixed my signature.

ARTHUR LAMBERT.